(12) United States Patent
Isoda et al.

(10) Patent No.: US 11,755,302 B2
(45) Date of Patent: Sep. 12, 2023

(54) APPLICATION PLACEMENT DEVICE AND APPLICATION PLACEMENT PROGRAM

(71) Applicant: Nippon Telegraph and Telephone Corporation, Tokyo (JP)

(72) Inventors: Takuma Isoda, Tokyo (JP); Yoji Yamato, Tokyo (JP); Hirofumi Noguchi, Tokyo (JP); Misao Kataoka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 80 days.

(21) Appl. No.: 17/432,707

(22) PCT Filed: Feb. 21, 2020

(86) PCT No.: PCT/JP2020/007256
§ 371 (c)(1),
(2) Date: Aug. 20, 2021

(87) PCT Pub. No.: WO2020/175411
PCT Pub. Date: Sep. 3, 2020

(65) Prior Publication Data
US 2022/0058009 A1 Feb. 24, 2022

(30) Foreign Application Priority Data

Feb. 25, 2019 (JP) .................................. 2019-032067

(51) Int. Cl.
*G06F 9/44* (2018.01)
*G06F 11/34* (2006.01)
(Continued)

(52) U.S. Cl.
CPC ............ *G06F 8/60* (2013.01); *G06F 9/44521* (2013.01)

(58) Field of Classification Search
CPC ...... G06F 8/60; G06F 9/44521; G06F 9/5066; G06F 9/5088; G06F 9/5011;
(Continued)

(56) References Cited

U.S. PATENT DOCUMENTS 10,248,397 B2 * 4/2019 Dain ................... G06F 11/3423
2002/0181403 A1 * 12/2002 Shiraki ................... H04L 45/00
703/2
(Continued)

OTHER PUBLICATIONS

Kawashima et al., "Scalable Virtual Network Embedding based on distributed model predictive control," IEICE Technical Report, 2015, 115:40, 13 pages (with English translation).
(Continued)

*Primary Examiner* — Thuy Dao
(74) *Attorney, Agent, or Firm* — Fish & Richardson P.C.

(57) ABSTRACT

Provided is an optimally deploying an application on a node of a network. An application deployment apparatus 10 is an apparatus that deploys an application in a node N in a network 4, the network 4 including a plurality of the nodes N communicably connected by links L, and includes a deployment determination unit 14 configured to determine, as a deployment destination of the application, a node of the nodes N having a minimum cost including a computation cost of the node N and a communication cost of a links of the links L, and a deployment execution unit 15 configured to distribute the application to the determined node N.

10 Claims, 3 Drawing Sheets

(51) Int. Cl.
*G06F 9/455* (2018.01)
*G06F 11/14* (2006.01)
*G06F 9/445* (2018.01)
*G06F 8/60* (2018.01)

(58) Field of Classification Search
CPC .... G06F 9/45558; G06F 8/61; G06F 9/44505; G06F 9/455; H04L 43/091; G06N 3/105; G06N 3/08; G06N 5/04; G06N 3/063; G06N 5/022
See application file for complete search history.

(56) References Cited

U.S. PATENT DOCUMENTS

2008/0056291 A1* 3/2008 Liu ................ G06F 9/5088
370/431
2016/0216991 A1* 7/2016 Ansari ............. G06F 9/5094

OTHER PUBLICATIONS

Yamada et al., "Cost Minimization by Task Allocation in Application-Router Networks," IEICE Technical Report, 2015, 114(404):119-124, 13 pages (with English translation).

* cited by examiner

APPLICATION PLACEMENT DEVICE AND APPLICATION PLACEMENT PROGRAM

CROSS-REFERENCE TO RELATED APPLICATIONS

This application is a National Stage application under 35 U.S.C. § 371 of International Application No. PCT/JP2020/007256, having an International Filing Date of Feb. 21, 2020, which claims priority to Japanese Application Serial No. 2019-032067, filed on Feb. 25, 2019. The disclosure of the prior application is considered part of the disclosure of this application, and is incorporated in its entirety into this application.

TECHNICAL FIELD

The present disclosure relates to a technique for deploying an application in a node of a network.

BACKGROUND ART

In recent years, there has been increased technical advancement in Internet of Things (IoT), and data can be acquired from a large number of devices. In the current IoT service, data is acquired from an IoT device owned by an individual, and the data is collected and analyzed on a cloud server.

With respect to optimum utilization of resources present on a network, research on techniques for optimizing an embedded position of a Virtual Network (VN) into a server on the network have advanced. Non Patent Literature 1 describes a technique for determining an optimum deployment of a VN taking into consideration communication traffic.

CITATION LIST

Non Patent Literature

Non Patent Literature 1: Kohta Kawashima, et al., "Scalable virtual network embedding based on distributed model predictive control", vol. 115, pp. 19-24, 2015

SUMMARY OF THE INVENTION

Technical Problem

In the embedding of the VN, a computation resource quantity of an edge server is not taken into consideration. Furthermore, in a case where data from an IoT device is actually subjected to computation processing, a required processing time and necessary data are considered to be different according to an application. The edge server has computation resources smaller in scale than a cloud server, and thus, has a limited number of processable applications.

The present disclosure has been devised in view of the above-described point, and an object of the present disclosure is to provide an application deployment apparatus and an application deployment program capable of optimally deploying an application in a node of a network.

Means for Solving the Problem

To achieve the above-described object, the present disclosure provides an application deployment apparatus configured to deploy an application in a node in a network, the network including a plurality of the nodes communicably connected by links, the application deployment apparatus including a deployment determination unit configured to determine, as a deployment destination of the application, a node of the nodes having a minimum cost including a computation cost of the node and a communication cost of a link of the links, and a deployment execution unit configured to distribute the application to the determined node.

According to such a configuration, it is possible to deploy the application on an optimum node in the network and to reduce the computation cost and the communication cost.

The deployment determination unit may be configured to determine the deployment destination of the application to satisfy, as a constraint condition, a condition that a resource to be used by the application is equal to or less than a resource of the node.

According to such a configuration, it is possible to suitably deploy the application in a range without exceeding the performance of the node.

The deployment determination unit may be configured to determine the deployment destination of the application to satisfy, as a constraint condition, a condition that a band to be used by the application is equal to or less than a band of the link.

According to such a configuration, it is possible to suitably deploy the application in a range without exceeding the performance of the link.

The deployment determination unit may be configured to determine the deployment destination of the application to satisfy, as a constraint condition, a condition that a sum of a time required to deploy the application in the node and a time to execute the application in the node is equal to or less than an allowable delay time.

According to such a configuration, it is possible to suitably deploy the application, for example, in a range without exceeding the allowable delay time specified by a user.

The deployment determination unit may be configured to determine the deployment destination of the application to satisfy the constraint condition from among results of calculating the costs.

According to such a configuration, an objective function of a cost is computed for all patterns of the deployment, and then, solutions are narrowed down under the constraint condition. Thus, it is possible to suitably cope with changes in the constraint condition.

The deployment determination unit may be configured to determine, as the deployment destination of the application, the node having the minimum cost from among the nodes satisfying the constraint condition.

According to such a configuration, the objective function of the cost is computed within a range of the patterns of the deployment limited by the constraint condition, and thus, it is possible to derive the solution in a short period of time.

The present disclosure can also be embodied as an application deployment program that causes a computer to operate as the application deployment apparatus.

Effects of the Invention

According to the present disclosure, it is possible to deploy an application in an optimum node in a network by reducing a computation cost and a communication cost.

DESCRIPTION OF EMBODIMENTS

The inventors of the present application believe that, to develop and operate a variety of IoT services at low cost in the future, it is necessary to separate the IoT devices and services and to make the IoT devices and the services interoperable through horizontal separation. However, in this case, there is a concern for an increase in communication traffic volume with an increase in interoperable IoT devices.

For this reason, data from the IoT device needs to be processed on an edge side by executing an application with edge-side resources close to the IoT device. However, the edge-side resources are smaller in scale than cloud-side resources, and thus, the number of processable applications and the amount of data from the IoT device are limited. Accordingly, in the present disclosure, a sum of a computation resource usage cost and a communication cost is minimized to reduce a load on resources, and also a requirement for an IoT application (resources of a Central Processing Unit (CPU) and a Graphic Processor Unit (GPU), a communication band, and an allowable delay time) is satisfied.

This is because the communication cost increases with an increase in traffic volume. Furthermore, the reason to minimize the sum of the computation resource usage cost and the communication cost is because in a case where only the communication cost is reduced, processing of the application can be concentrated on the edge-side resources, thereby increasing a load on the small-scale edge-side resources and increasing the computation resource usage cost.

That is, the present disclosure distributes an application performing data analysis or data pre-processing in a server (a node in the network) close to the IoT device rather than storing all pieces of data of all IoT devices in a cloud server. That is, the amount of data is made small and the overall traffic volume is reduced by optimally deploying an application performing computation processing of data acquired from the IoT device in a resource (node) present on the network.

Figure 1:
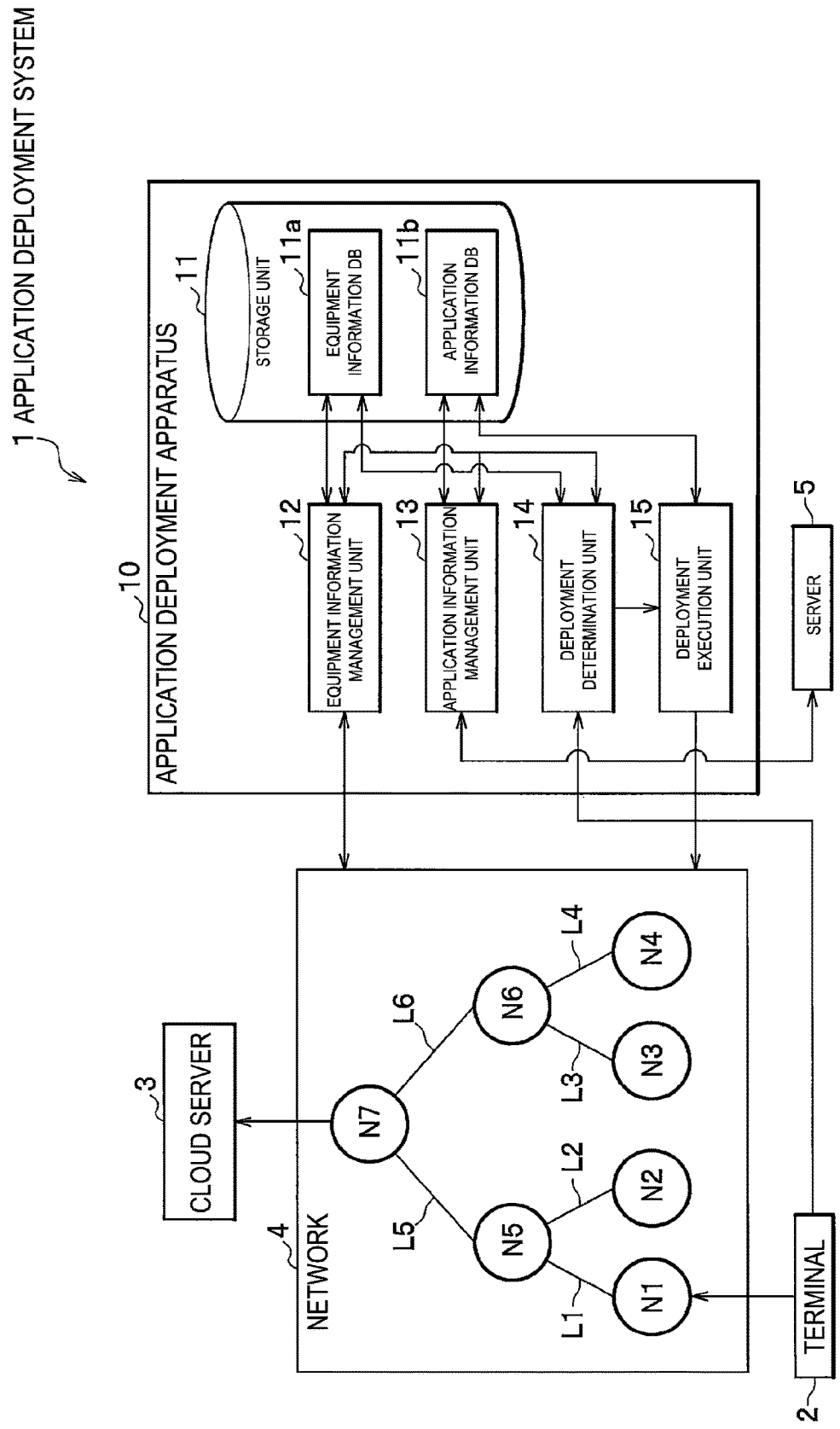
FIG. 1 is a block diagram schematically illustrating an application deployment system according to an embodiment of the present disclosure.

Hereinafter, an embodiment of the present disclosure will be described in detail appropriately referring to the drawings. As illustrated in FIG. 1, an application deployment system 1 according to the embodiment of the present disclosure is a system that processes data acquired from a terminal 2 by an application and stores the processed data in a cloud server 3. The application deployment system 1 includes a network 4 and an application deployment apparatus 10. Here, the terminal 2 is an Internet of Things (IoT) device that acquires data to be processed by the application and transmits data to the network 4, and is, for example, an Internet Protocol (IP) camera.

Network

The network 4 communicably connects the terminal 2 and the cloud 3, and in the embodiment, a plurality of nodes N (N1 to N7) are connected in a tree structure by links L (L1 to L6). Each of the nodes N transfers data transmitted from the terminal 2 toward the cloud server 3, processes data by the application deployed in the node N, and transfers the processed data toward the cloud server 3.

Figure 2:
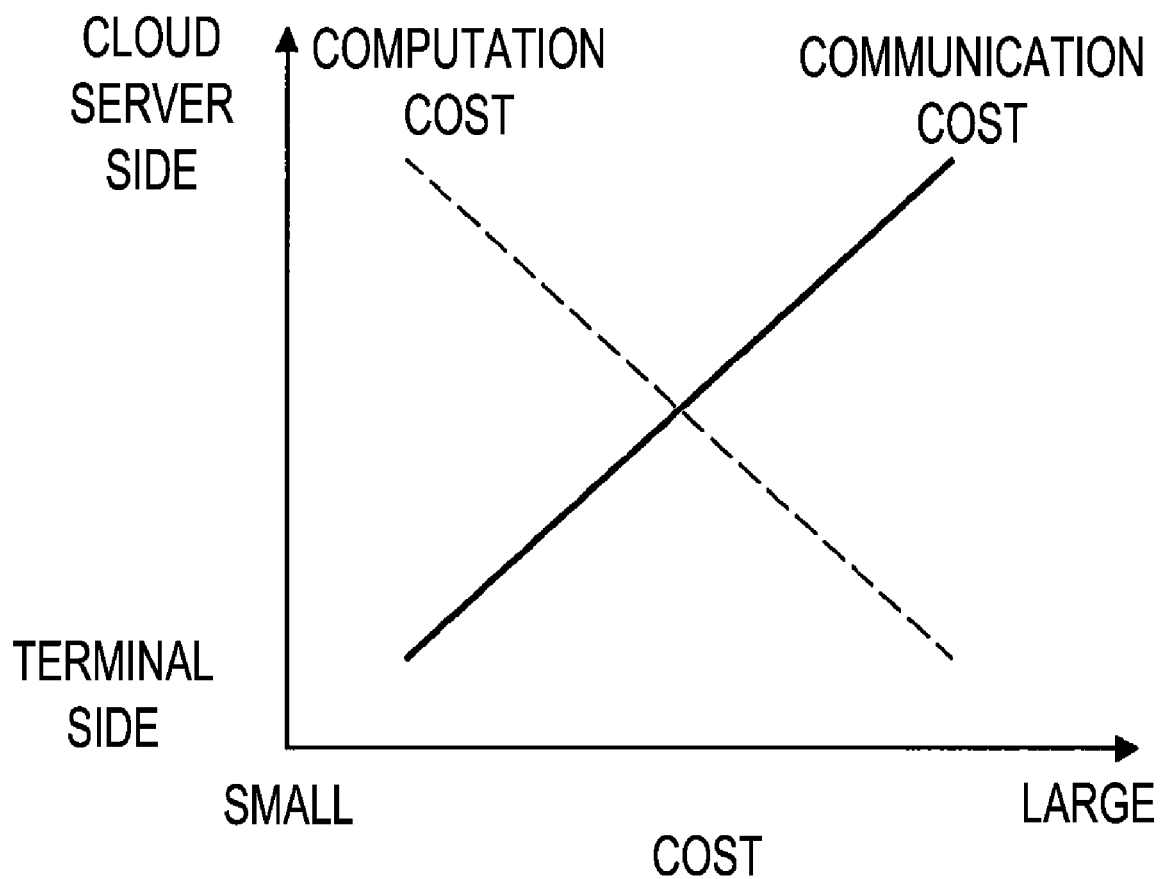
FIG. 2 is a graph schematically illustrating an example of a relationship between a position of a node in a network, and a computation cost and a communication cost.

As illustrated in FIG. 2, as a cost of data processing by the node N, a computation cost becomes smaller as the node N is closer to the cloud server 3 (the computation cost becomes greater as the node N is closer to the terminal 2). This is because the node N near the cloud server 3 is better in performance. This is because, the node N closer to the cloud server 3 is expected to have a reduced idle time and high equipment availability according to a statistical multiplexing effect, and thus, a significant effect is obtained by arranging a high performance node N close to the cloud server 3. On the other hand, a communication cost becomes greater as the node N is closer to the terminal 2 (the communication cost becomes smaller as the node N is closer to the cloud server 3). This is because a load of each link L becomes smaller as a section where the processed data is transferred is longer.

Application Deployment Apparatus

As illustrated in FIG. 1, the application deployment apparatus 10 is an apparatus that deploys an application performing pre-processing of data to be transferred to the cloud server 3 in any of the plurality of nodes N in the network 4. The application deployment apparatus 10 includes a Central Processing Unit (CPU), a Read-Only Memory (ROM), a Random Access Memory (RAM), an input-output circuit, and the like. The application deployment apparatus 10 includes, as functional units, a storage unit 11, an equipment information management unit 12, an application information management unit 13, a deployment determination unit 14, and a deployment execution unit 15.

Storage Unit

The storage unit 11 includes an equipment information database 11a and an application information database 11b. The equipment information database 11a stores information regarding equipment (equipment information, for example, $\alpha_i$, $\beta_j$, $C^n_i$, $B^l_k$, $C^l_j$, and the like described below) for each piece of equipment (nodes N and links L) of the network 4. The application information database 11b stores an application and information regarding the application (application information, for example, $B^n_k$, $C_k$, $B^a_k$, and the like described below) in association with each other. The application information may be obtained, for example, by measuring performance with a verification apparatus.

Equipment Information Management Unit

The equipment information management unit 12 manages (adds, updates, corrects, deletes, or the like) the equipment information stored in the equipment information database 11a. The equipment information management unit 12 acquires the equipment information of the network 4 from the nodes N of the network 4 and stores the acquired equipment information in the equipment information database 11a.

Application Information Management Unit

The application information management unit 13 manages (adds, updates, corrects, deletes, etc.) the application information stored in the application information database 11b. The application information management unit 13 acquires an application and application information of the application from a server 5 or the like of a production company of the application and stores the acquired application and application information in the application information database 11b.

Deployment Determination Unit

The deployment determination unit 14 deploys the application in any of the plurality of nodes N in the network 4 based on the equipment information stored in the equipment information database 11a, the application information stored in the application information database 11b, and information acquired from the terminal 2 (information regarding the terminal 2, an allowable delay time, and the like).

First Constraint Condition

Here, the deployment determination unit 14 limits an application deployment not to exceed an upper limit of computation resources of each node N based on the following expression (first constraint condition).

$$\sum_k \left( A_{i,k}^n \cdot B_k^n \right) \le C_i^n \cdot M_i^n \quad \text{[Math. 1]}$$

$A^n_{i,k}$: the presence or absence of an operation of a k-th application in an i-th node N ("1" when the operation is present, "0" when the operation is absent)
$B^n_k$: a resource quantity that the k-th application uses in the node N
$C^n_i$: a resource upper limit of the i-th node N in a physical space
$M^n_i$: the presence or absence of usage of the i-th node N in the physical space ("1" when the i-th node N is used, "0" when the i-th node N is not used)
In the embodiment, $B^n_k$ is a quantity occupied by an application in an application storage area within the node N in a case where the application is stored in the node N. $C^n_i$ is an index for determining the number of applications that can be deployed (stored) and executed in the node N, and is, for example, a storage capacity of a storage, a memory, or the like of a computer serving as the node N.

In the expression indicating the first constraint condition, a left-hand side represents the number (or amount) of applications deployed in the i-th node N in a combination in which the applications are deployed tentatively. A right-hand side represents the number (or amount) of applications that can be deployed in the i-th node N in the network 4.

Second Constraint Condition

The deployment determination unit 14 limits the application deployment not to exceed an upper limit of a band of each link L based on the following expression (second constraint condition).

$$\sum_k \left( A_{j,k}^l \cdot B_k^l \right) \le C_j^l \cdot M_j^l \quad \text{[Math. 2]}$$

$A^l_{j,k}$: the presence or absence of usage of the k-th application in a j-th link L ("1" when the k-th application is used, "0" when the k-th application is not used)
$B^l_k$: a band that the k-th application uses in the link L
$C^l_j$: a band upper limit of the j-th link L in the physical space
$M^l_j$: the presence or absence of usage of the j-th link L in the physical space ("1" when the j-th link L is used, "0" when the j-th link L is not used)
In the embodiment, $B^l_k$ is a maximum amount capable of communicating with the link L, and is, for example, a maximum value of a communication bandwidth, a communication speed, or the like determined by a communication service provider.

In the expression indicating the second constraint condition, a left-hand side represents the number (or amount) of applications that cause traffic to flow to the j-th link L in a combination in which the applications are deployed tentatively. A right-hand side represents the number (or amount) of applications that cause traffic to flow to the j-th link L within the network 4.

Third Constraint Condition

The deployment determination unit 14 limits the application deployment not to exceed an upper limit of a processing time ($\text{TIME}_k$) based on the following expression (third constraint condition).

$$\sum_j \left( A_{j,k}^l \cdot \frac{C_k}{B_k^l} \right) + \sum_i \left( A_{i,k}^n \cdot B_k^a \right) \le \text{TIME}_k \quad \text{[Math. 3]}$$

$C_k$: a capacity of the k-th application
$B^a_k$: a time required for data processing in the k-th application
In the embodiment, $B^a_k$ is a time from when data is acquired (from when the application starts processing) until the processed data is output when the node N processes the data using the application.

In the expression indicating the third constraint condition, a first term on a left-hand side represents a time required for deploying the application in the node N through the link L. A second term on the left-hand side represents a time required for executing the application. A right-hand side represents an upper limit of the processing time required by the user, that is, an allowable delay time. The allowable delay time is a delay time allowed by the user for a time from when the application is requested until a processing result by the application is output.

Objective Function Regarding Cost

The deployment determination unit 14 determines, as the deployment destination of the application, a node N where a cost including a computation cost of the node N and a communication cost of the link L is minimized. In the embodiment, the deployment determination unit 14 calculates a cost (COST) based on the following expression (objective function) within a range where the first to third constraint conditions are satisfied, and determines the deployment of the application where the cost is minimized.

$$\text{COST} = \sum_{i \in \text{Node}} (\alpha_i \cdot M_i^n) + \sum_{j \in \text{Link}} \left[ \beta_j \cdot M_j^l \left\{ \frac{1}{C_j^l} \sum_{jk \in \text{App}} \left( A_{j,k}^l \cdot B_k^l \right) \right\} \right] \quad \text{[Math. 4]}$$

$\alpha_i$: a cost when the i-th node N is used
$\beta_j$: a cost when the j-th link L is used
In the embodiment, $\alpha_i$ is a cost when the i-th node N is used, and is, for example, a fee when a computer is used as the node N.

In addition, $\beta_j$ is a cost when a line connecting the nodes N is used to the maximum extent, and is, for example, a communication fee determined by the communication service provider.

In the expression indicating the objective function, a first term on a right-hand side represents a total of the computation costs of the nodes N in a combination in which k applications are deployed tentatively. In other words, the first term of the right-hand side is a sum of a product of the node N usage cost and the presence or absence of usage of the node N for all nodes N.

A second term on the right-hand side represents a total of the communication costs of the links L in a combination in which k applications are deployed tentatively. In other words, the second term on the right-hand side is a sum of the link L usage cost and a product of the presence or absence of usage of the link L and the link L usage rate for all links L. Here, the link L usage band rate has a band upper limit of a target link L as a denominator and a band occupied by all applications using the link L as a numerator.

Note that either the first to third constraint conditions or the objective function may be applied earlier. That is, the deployment determination unit 14 may select, as the deployment destination of the application, a node satisfying the three constraint conditions from among nodes having a minimum objective function or may select a node having the minimum objective function from among nodes satisfying the three constraint conditions.

Deployment Execution Unit

The deployment execution unit 15 acquires an application deployment having a minimum cost while satisfying various constraint conditions, which is determined by the deployment determination unit 14, and distributes the application stored in the application information database 11b to the corresponding node N based on acquired content.

Operation Example

Figure 3:
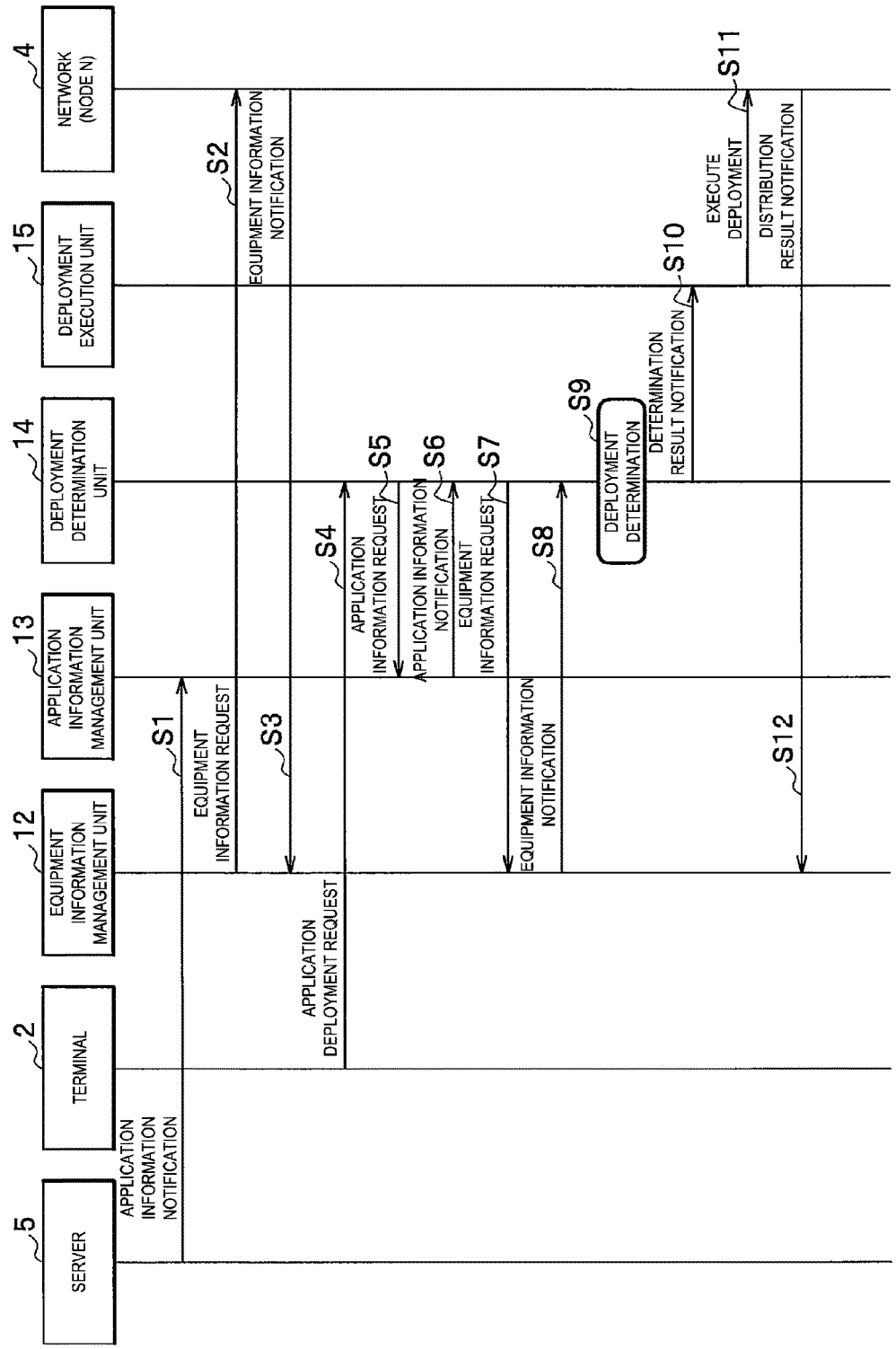
FIG. 3 is a sequence diagram schematically illustrating an operation example of the application deployment system according to the embodiment of the present disclosure.

An operation example of the application deployment system 1 according to the embodiment of the present disclosure will be described referring to FIG. 3 (appropriately see FIG. 1).

First, the application information management unit 13 of the application deployment apparatus 10 acquires an application and application information from the server 5 of the production company or the like of the application (application information notification, Step S1). Subsequently, the application information management unit 13 stores the acquired application and application information in the application information database 11b.

Furthermore, the equipment information management unit 12 of the application deployment apparatus 10 transmits an equipment information request to each node N of the network 4 (equipment information request, Step S2). Subsequently, upon receipt of the equipment information request, each node N of the network 4 transmits equipment information to the equipment information management unit 12 (equipment information notification, Step S3). Subsequently, upon receipt of the equipment information, the equipment information management unit 12 stores the received equipment information in the equipment information database 11a.

Note that either Step S1 by the server 5 and the application information management unit 13 or Steps S2 and S3 by the equipment information management unit 12 and the network 4 may be executed earlier.

Subsequently, the terminal 2 owned by the user transmits an application deployment request including an allowable delay time (application deployment request, Step S4). Subsequently, upon receipt of the application deployment request, the deployment determination unit 14 transmits an application information request to the application information management unit 13 (application information request, Step S5). Subsequently, upon receipt of the application information request, the application information management unit 13 reads corresponding application information from the application information database 11b and outputs the read application information to the deployment determination unit 14 (application information notification, Step S6).

Furthermore, the deployment determination unit 14 transmits an equipment information request to the equipment information management unit 12 (equipment information request, Step S7). Subsequently, upon receipt of the equipment information request, the equipment information management unit 12 reads corresponding equipment information from the equipment information database 11a and outputs the read equipment information to the deployment determination unit 14 (equipment information notification, Step S8).

Note that either Steps S5 and S6 by the deployment determination unit 14 and the application information management unit 13 or Steps S7 and S8 by the deployment determination unit 14 and the equipment information management unit 12 may be executed earlier.

Subsequently, the deployment determination unit 14 determines in which node N of the network 4 the application is deployed based on the obtained application deployment request, application information, and equipment information (deployment determination, Step S9). Subsequently, the deployment determination unit 14 outputs a determination result of Step S9 to the deployment execution unit 15 (determination result notification, Step S10).

Subsequently, upon acquisition of the determination result, the deployment execution unit 15 reads a corresponding application from the application information database 11b based on the acquired decision result and distributes the read application to the corresponding node N (deployment execution, Step S11).

Subsequently, when the application is deployed, the node N of the network 4 transmits a deployment result to the equipment information management unit 12 (distribution result notification, Step S12). Subsequently, upon receipt of the deployment result, the equipment information management unit 12 stores the received deployment result in the equipment information database 11a.

Deployment Example of Application

As an example of the present disclosure, a technique for determining an optimum deployment of two applications in the network 4 having a perfect binary tree structure with three nodes N (see nodes N1, N2, and N5 in FIG. 1; however, N5 is read as N3) will be described.

It is assumed that various parameters are set as follows (units are omitted).

- Capacity $C^n_i$ of every node is 10 (that is, $C^n_1 = C^n_2 = C^n_3 = 10$)
- Node usage cost $\alpha_i$: $\alpha_1=1$, $\alpha_2=2$, $\alpha_3=3$
- Band upper limit $C^l_j$ of every link is 1000 (that is, $C^l_1 = C^l_2 = 1000$)
- Application information: allowable delay time=50, capacity=15, processing time=10, and band to be used=15 for each of the two applications
- Link usage cost $\beta_j$ of every link is 1000 (that is, $\beta_1 = \beta_2 = 1000$)

Note that the terminal 2 that transmits data to be processed by the two applications to the network 4 is connected to the node N1.

Here, the result 10<15×2 is obtained by using the expression indicating the first constraint condition. Thus, it can be understood that the two applications cannot be deployed in one of the nodes N1 to N3.

Moreover, the result 1000>max (15×2, 15×1) is obtained by using the expression indicating the second constraint condition. Thus, it can be understood that the deployment of the applications is not restricted by the second constraint condition.

Furthermore, the result 50>max (10, 10+15/15×1, 10+15/15×2) is obtained by using the expression indicating the third constraint condition. Thus, it can also be understood that the deployment of the applications is not restricted by the third constraint condition.

In view of the above, the two applications are attempted to be deployed in two of the three nodes N1 to N3.

Case where one of the two applications is deployed in each of the nodes N1 and N2 COST=(1+2)+(0+1000×15/1000+1000×15/1000)=33

Case where one of the two applications is deployed in each of the nodes N2 and N3 COST=(2+3)+(1000×15/1000+1000×15/1000)=35

Case where one of the two applications is deployed in each of the nodes N1 and N3 COST=(1+3)+(0+1000×15/1000)=19

Thus, in this example, one of the two applications is deployed in the node N1, among the nodes N1 and N3 connected by the link L1, and the other of the two applications is deployed in the node N3. Here, in which of the nodes N1 and N3 each of the two applications is deployed can be appropriately set.

The application deployment system 1 according to the embodiment of the present disclosure determines a node N where the application is to be deployed using the objective function regarding the cost so as to minimize the cost, whereby it is possible to deploy the application in an optimum node N in the network 4 and to suppress a computation cost and a communication cost.

The application deployment system 1 determines the deployment destination of the application using the first constraint condition, whereby it is possible to suitably deploy the application in a range without exceeding the performance of each node N.

The application deployment system 1 determines the deployment destination of the application using the second constraint condition, whereby it is possible to suitably deploy the application in a range without exceeding the performance of each link L. The application deployment system 1 determines the deployment destination of the application using the third constraint condition. Thus, it is possible to suitably deploy the application in a range without exceeding the allowable delay time by the user.

Note that, in a case of performing computation in an order of the objective function of the cost to the constraint conditions, the application deployment system 1 computes the objective function of the cost for all patterns of the deployment, and then, narrows down solutions under the constraint conditions. Thus, it is possible to suitably cope with changes in the constraint conditions.

Furthermore, in a case of performing computation in an order of the constraint conditions to the objective function of the cost, the application deployment system 1 computes the objective function of the cost within a range of the patterns of the deployment limited by the constraint conditions. Thus, it is possible to derive a resolution in a short period of time.

Hitherto, the embodiment of the present disclosure has been described. However, the present disclosure is not limited to the above embodiment, and can be appropriately changed in a range without departing from the gist of the present disclosure. For example, the present disclosure can also be embodied as an application deployment program that causes a computer to function as the application deployment apparatus 10. At least one of the first to third constraint conditions can be omitted. Moreover, the objective function of the cost and the constraint conditions are not limited to the respective expressions described above.

REFERENCE SIGNS LIST

1 Application deployment system
2 Terminal
3 Cloud server
4 Network
10 Application deployment apparatus
14 Deployment determination unit
15 Deployment execution unit
L Link
N Node

The invention claimed is:

1. An application deployment apparatus configured to deploy an application in a node in a network, the network including a plurality of the nodes communicably connected by links, the application deployment apparatus comprising:
a deployment determination unit, including one or more processors, configured to determine, as a deployment destination of the application, a node of the nodes having a minimum cost including a computation cost of the node and a communication cost of a link of the links; and
a deployment execution unit, including one or more processors, configured to distribute the application to the determined node; wherein
the deployment determination unit is configured to determine the deployment destination of the application to satisfy, as a constraint condition, a condition that a sum of a time required to deploy the application in the node and a time to execute the application in the node is equal to or less than an allowable delay time.

2. The application deployment apparatus according to claim 1, wherein
the deployment determination unit is configured to determine the deployment destination of the application to satisfy, as a constraint condition, a condition that a resource to be used by the application is equal to or less than a resource of the node.

3. The application deployment apparatus according to claim 2, wherein
the deployment determination unit is configured to determine the deployment destination of the application to satisfy the constraint condition from among results of calculating the costs.

4. The application deployment apparatus according to claim 2, wherein
the deployment determination unit is configured to determine, as the deployment destination of the application, the node having the minimum cost from among the nodes satisfying the constraint condition.

5. The application deployment apparatus according to claim 1, wherein
the deployment determination unit is configured to determine the deployment destination of the application to satisfy, as a constraint condition, a condition that a band to be used by the application is equal to or less than a band of the link.

6. A non-transitory computer readable medium storing an application deployment program for deploying an application in a node in a network, the network including a plurality of the nodes communicably connected by links, causes a computer to execute:
determining, as a deployment destination of the application, a node of the nodes having a minimum cost including a computation cost of the node and a communication cost of a link of the links; and
executing deployment by distributing the application to the determined node;
wherein the stored application deployment program causes the computer to execute:
determining the deployment destination of the application to satisfy, as a constraint condition, a condition that a sum of a time required to deploy the application in the node and a time to execute the application in the node is equal to or less than an allowable delay time.

7. The non-transitory computer readable medium according to claim 6, wherein the stored application deployment program further causes the computer to execute:
   determining the deployment destination of the application to satisfy, as a constraint condition, a condition that a resource to be used by the application is equal to or less than a resource of the node.

8. The non-transitory computer readable medium according to claim 7, wherein the stored application deployment program further causes the computer to execute:
   determining the deployment destination of the application to satisfy the constraint condition from among results of calculating the costs.

9. The non-transitory computer readable medium according to claim 7, wherein the stored application deployment program further causes the computer to execute:
   determining, as the deployment destination of the application, the node having the minimum cost from among the nodes satisfying the constraint condition.

10. The non-transitory computer readable medium according to claim 6, wherein the stored application deployment program further causes the computer to execute:
    determining the deployment destination of the application to satisfy, as a constraint condition, a condition that a band to be used by the application is equal to or less than a band of the link.

* * * * *